Dec. 7, 1926.  
V. MASSACESE  
1,610,104
FURNITURE SPRING
Filed Oct. 25, 1924
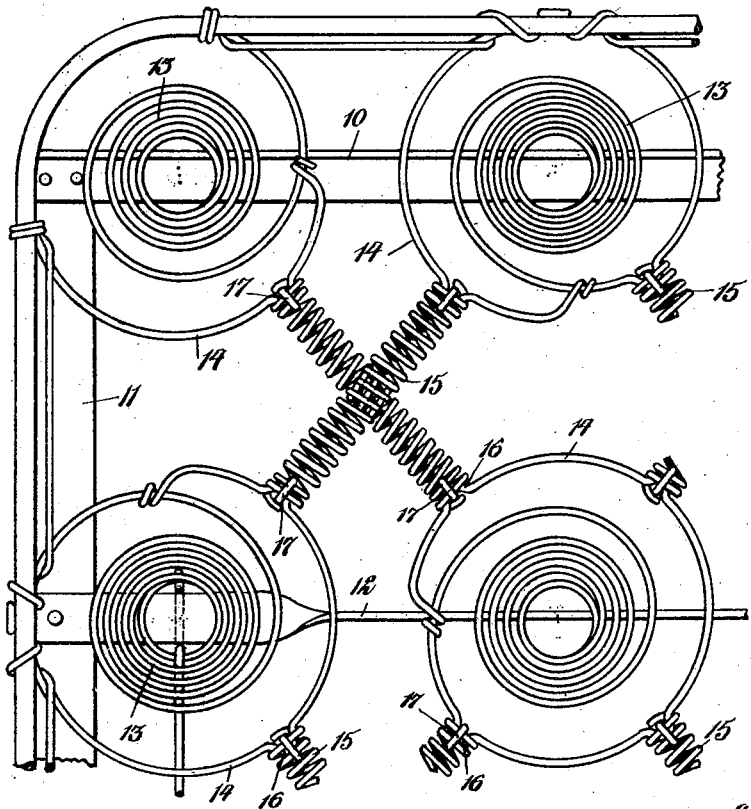
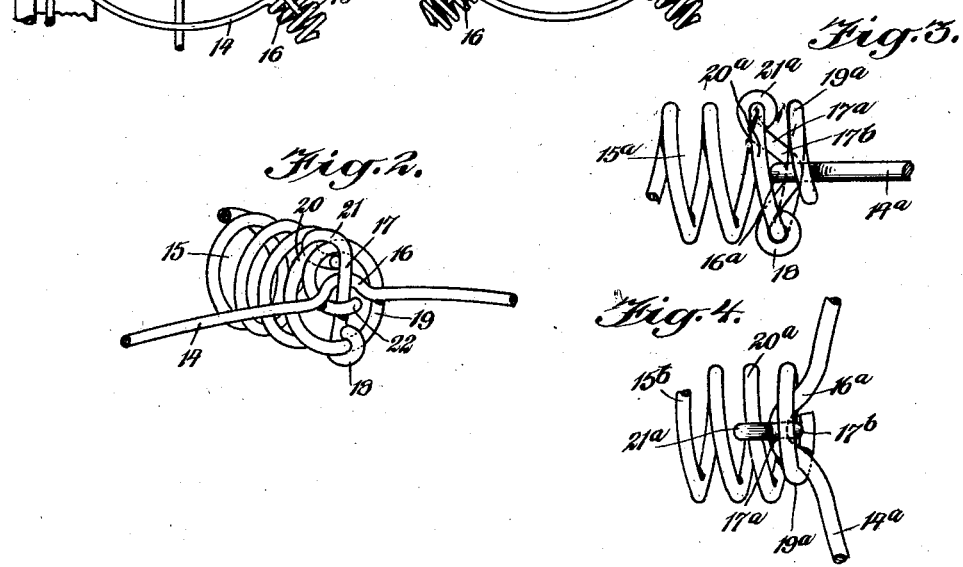
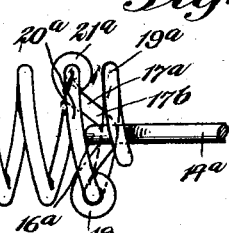
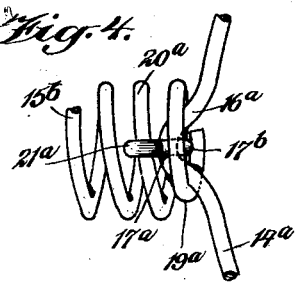
WITNESSES
INVENTOR  
Vincenzo Massacese  
BY  
ATTORNEYS Patented Dec. 7, 1926.

1,610,104

UNITED STATES PATENT OFFICE.

VINCENZO MASSACESE, OF NEW YORK, N. Y.

FURNITURE SPRING.

Application filed October 25, 1924. Serial No. 745,895.

This invention relates to furniture springs and refers more particularly to an improvement in springs for beds, couches or the like, and of the type which include a plurality of volute springs the upper and larger end convolutions of which are connected and braced by suitable connecting elements.

At the present time these connecting elements which may be in the form of crossed coiled expansion springs are connected to the larger end convolutions of volute springs in such a manner as to permit of relative circumferential shifting of the former with respect to the latter which results in a clashing noise when the bed is in use, in addition to the failure of the spring structure to properly support the weight of the user.

To overcome the above recited objectionable features and disadvantages, it is therefore the principal object of the present invention to provide a means of connection between the connecting elements and the larger end convolutions of the volute springs, which means of connection positively precludes any relative circumferential shifting of the connecting elements with respect to the volute springs.

The invention furthermore comprehends an improvement in spring structures of the character set forth which is of extremely simple construction, which does not therefore materially increase the cost of production of the structure and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a fragmentary plan view of a spring structure embodying the present invention.

Figure 2 is an enlarged perspective view illustrating the improved connection between the connecting elements and the volute springs.

Figure 3 is a fragmentary side elevation of a slightly modified adaptation of said connection.

Figure 4 is a fragmentary plan view thereof.

Referring to the drawings by characters of reference 10 and 11 designate the marginal rails of the spring structure upon which and the connecting cross rails 12, a plurality of volute springs 13 are supported in the usual manner with the larger end convolutions 14 disposed uppermost. At the present time the upper enlarged convolutions 14 are connected to the diagonally adjacent volute springs by connecting elements such as the crossed coiled expansion springs 15, the opposite end convolutions of which are formed in an eye which loosely embraces the convolutions of the volute springs 13. This construction however, has been found to admit of a relative shifting movement of the crossed spring terminals with respect to the convolutions 14, thereby resulting in a clashing noise and a failure to properly brace the spring structure and comfortably support the weight of the user.

The present invention therefore comprehends a means of connection between the crossed spring terminals and the upper and larger end convolutions 14 of the volute springs 13 which positively precludes relative circumferential shifting movement of said terminals with respect to said convolutions. This means consists of outwardly offset portions 16 in the convolutions 14 within which the medial portions of members or shanks 17 of the connecting elements are engaged, the lower terminals of which are formed into an eye 18 embracing the juncture of the end convolution 19 with the next adjacent convolution 20 of the crossed spring 15. The upper end of the shank or member 17 is formed into an elongated eye 21 which embraces a portion of the two end convolutions 19 and 20 at a point opposite that embraced by the eye 18, while the terminal 22 of the end convolution 19 embraces the shank immediately below the offset portion 16. It thus follows that the member or shank 17 extends transversely of the crossed springs and that the offset portion 16 projects slightly into the terminal or end of the said crossed springs.

In the modified form of the invention illustrated in Figures 3 and 4 the connecting clip includes a shank 17$^a$ having an offset central portion 17$^b$ which engages in the offset portion 16$^a$ of the end convolution 14$^a$ of the volute spring. The lower terminal or end is formed into an eye 18ª which engages the juncture of the outermost convolution 19ª and the next adjacent convolution 20ª of the crossed spring terminals 15ª. In this instance however the upper terminal of the clip shank 17ª is provided with an eye 21ª which engages the second convolution 20ª only.

I claim:

1. In a spring structure of the character described, a plurality of springs having radially projecting and spaced offsets in the upper end convolutions thereof, and cross springs connecting the first springs and into which the offsets of the first springs project, the cross springs being provided with transverse members having their ends secured thereto at diametrically opposite points, said members engaging within the offsets and embraced by the terminals of the end convolutions of the cross springs at one side of the offsets and adjacent thereto.

2. In a spring structure of the character described, a plurality of volute springs having radially projecting and spaced offsets in the upper end convolutions thereof, cross springs connecting the volute springs and into which the offsets project, and a transverse member at the ends of each cross spring, said member engaging an offset and embraced by the terminal of the end convolutions of the said cross spring below and adjacent to the offset of the volute spring, the said transverse member having eyes at its ends, one of which receives a convolution of the cross spring and the other two convolutions of said spring.

VINCENZO MASSACESE.